Sept. 29, 1953    H. G. CANTRELL    2,653,721
LOADING DEVICE
Filed Oct. 20, 1950    2 Sheets—Sheet 1
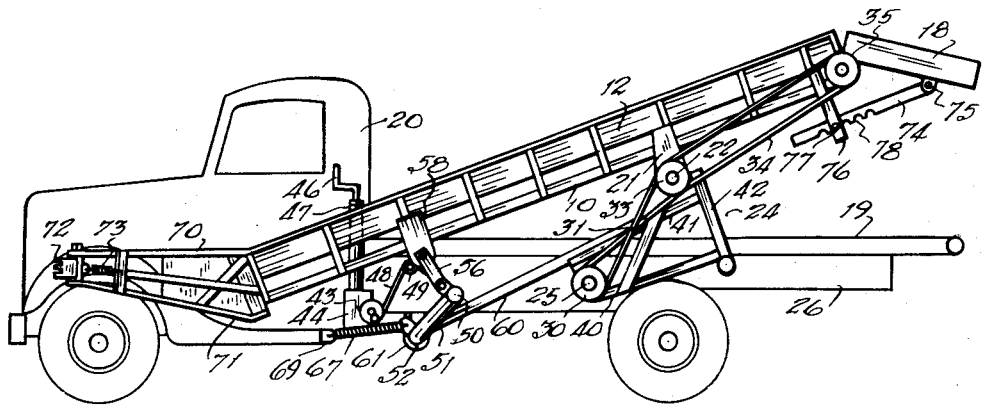
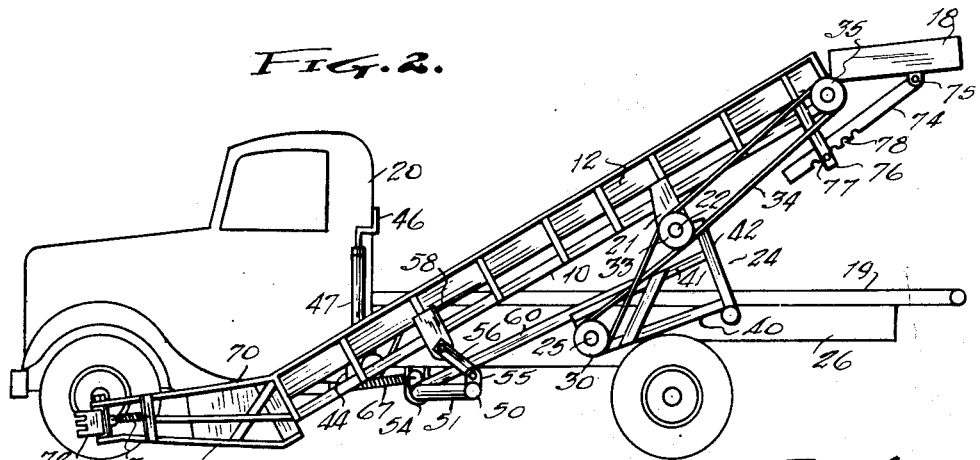
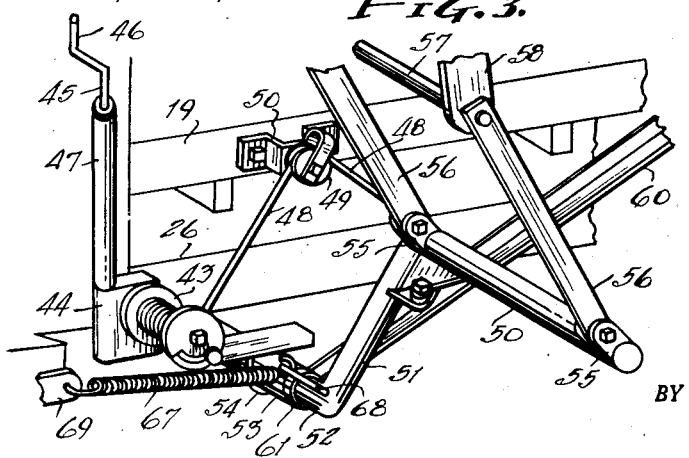
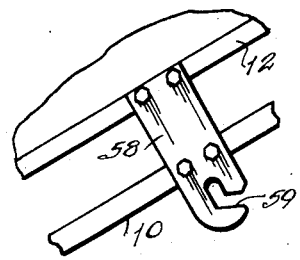
HERSEL G. CANTRELL
INVENTOR.
BY Cecil L. Wood
ATTORNEY

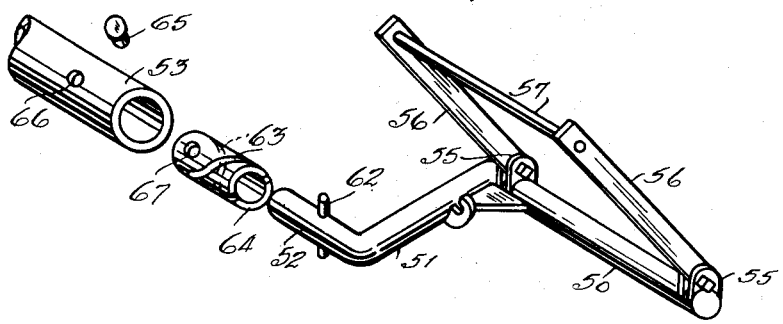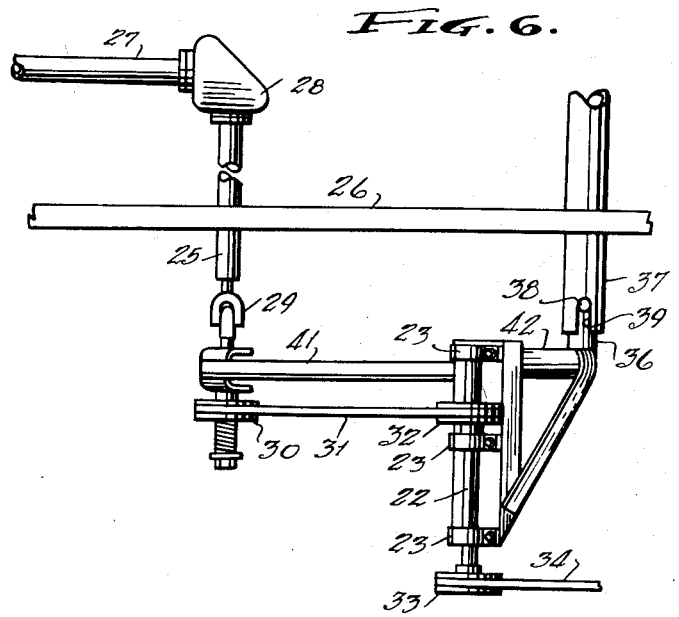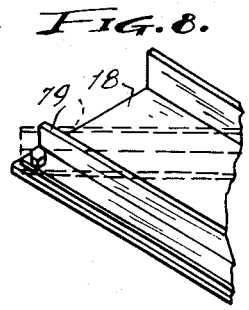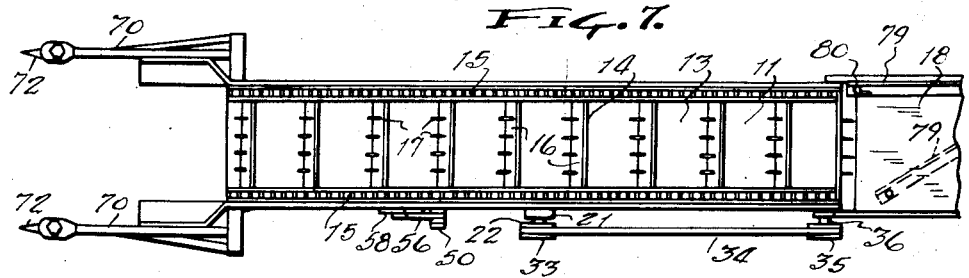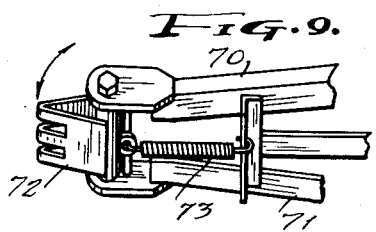

Patented Sept. 29, 1953

2,653,721

UNITED STATES PATENT OFFICE 2,653,721

LOADING DEVICE

Hersel G. Cantrell, Jacksboro, Tex.

Application October 20, 1950, Serial No. 191,183

6 Claims. (Cl. 214—83.26)

This invention relates to loading devices designed for attachment to trucks, or the like, and it has particular reference to agricultural equipment and loading apparatus for baled hay which can be picked up from the field behind the baler, and its principal object resides in the provision of equipment which can be readily operated from the cab of the truck, so that the operator of the truck can manipulate the same to the bales to pick up the same and deliver them to the truck bed for stacking thereon by an attendant.

Another object of the invention resides in the provision of a loading device of simple design and structure in which is embodied a continuous traveling conveyor which, when the apparatus is in operative position, will automatically convey the bales to the uppermost end of the inclined elevator structure to an adjustable table where the bales are deflected laterally or sidewise toward the truck body and positioned where the attendant can stack the bales in orderly fashion upon the bed of the truck, thus resulting in a great saving of time and labor in picking up and hauling hay from the field to storage.

A still further object of the invention resides in the provision of a unique raising and lowering device, by which the assembly is attached to a truck, and which is readily accessible to the operator thereof from the cab of the truck so that, when the truck is being ported from one location to another, as when it has been loaded, the elevator apparatus can be raised to an inoperative position and carried on the side of the truck for ready use when desired.

Broadly, the invention contemplates the provision of a detachable and adjustable inclined elevator assembly which is particularly adapted for mounting on a conventional truck, and driven thereby, and including features which afford easy manipulation and adjustment, and providing a device which can be attached to or removed from the truck with a minimum of difficulty.

While the foregoing objects are paramount, other and lesser objects will become manifest as the description proceeds, taken in connection with the appended drawings wherein:

Figure 1 is a side elevational view of the loading device, shown attached to a truck and illustrated in its raised or inoperative position.

Figure 2 is a side elevational view of the invention, shown attached to a truck, and illustrated in its operative position to pick up commodities for loading on the truck.

Figure 3 is a perspective illustration of the raising and lowering apparatus, by which the forward end of the elevator is adjusted with respect to the ground, and showing the manner in which the assembly is attached to a truck bed.

Figure 4 fragmentarily illustrates one of the brackets arranged on each side of the elevator frame structure by which the raising and lowering mechanism is connected thereto.

Figure 5 is a perspective illustration, showing the several parts extended, of the mechanism by which the elevator structure is moved toward or away from the truck in its vertical movement by the elevating mechanism shown in Figure 3.

Figure 6 is a fragmentary plan view of the driving mechanism for the assembly, including the shaft transversely connected to the drive shaft of the truck.

Figure 7 is a plan view of the elevator assembly, showing the traveling conveyor thereon and illustrating the forward guide arms.

Figure 8 fragmentarily illustrates the rearmost end of the table adjustably arranged on the uppermost end of the elevator assembly, and showing, in dotted lines, the adjusted position of the rail, and Figure 9 is a detailed perspective illustration of the outer ends of the guide arms showing the tensioned deflector members thereon.

The invention is therefore provided with an inclined elevator structure which comprises frame members 10 which are arranged parallel and spaced apart to define a relatively long and narrow trough 11 having sides 12 between which is provided a floor 13 over the surface of which a traveling conveyor 14 is moved. The conveyor 14 is of the type having a chain 15 on each side with transverse bars or slats 16 arranged therebetween which may be provided with spikes 17 to expedite the movement of hay which is carried upwardly from the forward end of the assembly to the table 18 adjustably attached to the upper or rearmost end over which the products raised by the assembly are discharged to the truck body 19, to which the assembly is attached, as in Figures 1 and 2, and where an operator standing on the truck bed 19 can properly arrange or stack the hay thereon. The assembly is adapted to be manipulated by the operator of the truck occupying the cab 20 thereof and through a mechanism which shall be presently described.

The elevator structure is pivotally supported, through a bracket 21 attached to each side thereof, which bracket has pivotal connection with a driven shaft 22 supported in bearings 23, as shown in Figure 6, or a frame structure 24 secured to the truck bed 19, as shown in Figures 1 and 2, and pivotally supported by a drive shaft 25 extending laterally from the truck body, and through the frame 26 thereon, and having a driven connection with the drive shaft 27 of the truck through a transverse gear assembly 28 so that the traveling conveyor 14 can be operated by the truck motor and through the conventional truck transmission. It is desirable that the shaft 25 have a universal joint 29 thereon to compensate for any disalignment of the assembly with respect to the drive shaft 25.

The conveyor assembly 14 is driven through the medium of a V-pulley 30 on the outer end of the shaft 25 and a V-belt 31 which is passed over a V-pulley 32 on the shaft 22 on whose outer end is mounted a V-pulley 33 having a V-belt 34 thereon which is passed over a V-pulley 35 on a shaft 36 at the upper end of the elevator assembly, as apparent in Figures 1 and 2. The pivoting of the elevator assembly on the shaft 22 will not affect the driving assembly for the conveyor 14, as shown in the different movements of the structure illustrated in Figures 1 and 2. The rearmost end of the frame assembly 24, supporting the elevator structure, is attached by inserting a stub shaft 36 formed thereon, as illustrated in Figure 6, into a tubular socket 37 attached to the truck frame member 26, a pin 38 being arranged vertically through the stub shafts 36 and insertable into a slot 39 formed in the outer end of the member 37, and such an arrangement provides for quick detachability of the assembly from the truck bed 19 when desired.

The frame structure 24 comprises parallel frame members 40 and 41, which are in a normally inclined position, as shown in Figures 1 and 2, and a transverse member 42 connecting the members 40 and 41 and providing a support which is rigidly connected, at its lower end, with the stub shaft 36. The bearings 23 are supported on the member 42. Adjustments of the elevator assembly, to operative and inoperative positions, illustrated in Figures 1 and 2, can be accomplished from the cab 20 of the vehicle by the manipulation of a winch 43 attached to the truck frame 26 or supported on the running board of the vehicle, and is operated through a gear reduction 44 and a shaft 45 having a crank 46 on its upper end, as shown in detail in Figure 3, the shaft 45 being arranged through a tubular housing 47 supported vertically along the side of the cab 20 so that the crank 46 may be made readily accessible to the operator of the vehicle from the cab window. A cable 48 is reeled upon the winch 43 and is passed over a pulley 49 attached to a bracket 50 on the side of the bed 19 of the truck. The opposite end of the cable 48 is secured to the inner end of the upper leg 50 of a crankshaft 51, the lower leg 52, being rotatively supported in a tubular housing 53 attached by means of a U-bolt 54 to the underside of the truck frame 26, the crankshaft assembly being shown in detail in Figure 5.

Integral with each end of the upper leg 50 of the crankshaft 51 are paired brackets 55 between each pair of which is pivoted a link 56, and these links have their upper ends pivotally connected to a shaft 57 which is arranged through the lower ends of brackets 58 secured to the frame members 10 of the elevator assembly, the brackets 58 having angular slots 59 in their lowermost ends, as shown in detail in Figure 4, so that the shaft 57 can be readily detached from the bracket 58 when it is desirable to remove the elevator assembly from the truck. An angular base member 60 is provided to afford a rigid connection between the lower leg 52 of the crank 51 and the frame assembly 24 which provides the pivotal support for the elevator assembly, and which has been previously described.

As apparent in Figure 5 the crankshaft 51 has a pin 62 arranged transversely through its lower crank member 52 and this pin is adapted to have each end operate in a pair of slots 63 formed in the sleeve 64 which is inserted into the member 53 and secured by a pin or bolt 65 through apertures 66 in the members 53 and 67 in the sleeve 64. Thus, when the crankshaft 51 is rotated in the member 53, the sleeve 64 being stationary therein, the crankshaft 51 will move longitudinally, or toward and away from the truck as the elevator assembly is raised or lowered, such provision is made in order that the forward end of the elevator assembly can properly clear the truck body, or fenders, in its vertical movement, and be arranged in proper operative position when the forward end is on the ground, as in Figure 2. A tensioning spring 67 is provided to aid in manipulating the crankshaft 51, and has its rearmost end attached to an integral bracket 68 on the lower leg 52 of the crankshaft 51, while its forward end is connected to a bracket 69 secured to the vehicle.

A pair of guide arms 70 extend forwardly of the elevator frame 10 and these members are designed to initially receive the bales on the ground, in the path of the elevator assembly, and guide the same to the conveyor 14 thereon. Members 70 are preferably open frame structures, as shown in Figures 1 and 2, with the lower members 71 thereof being capable of engaging the ground and serving as shoes or slides when it is necessary that the forward end of the elevator assembly actually engage the ground. A tensioned deflector member 72 is pivotally supported on each of the outer ends of the members 70, as shown in Figures 7 and 9, and these are engageable with the bales to be picked up and serve to guide the same between the members 70 which in turn retain the bale in alignment with the conveyor 14 operating between the walls 12 of the assembly.

The adjustable table 18 is pivotally secured at its inner end to the shaft 36 at the upper end of the elevator assembly, in the manner shown in Figures 1, 2 and 7, and is adjustably supported by notched levers 74 pivotally connected to brackets 75 on the underside of the table 18, and extend forwardly between depending arms 76 which are connected by a rod 77 which is engaged by the notches 78 in the lower edges of the arms 74 and whereby the table 18 can be adjusted to different positions with respect to the elevator assembly.

The inner side bar 79 of the table 18 is pivoted at its rearmost end but is capable of being secured by a latch 80 at its forward end, as apparent in Figure 7, so that it may be adjusted to the position shown in dotted lines in Figure 7 to open the side of the table 18 nearest the truck bed 19 to deflect the bales toward the bed 19 and automatically dumped thereon for the attendant to arrange the same upon the bed 19.

Manifestly, the structure herein shown and described is capable of certain changes and modifications, from time to time, by persons skilled in the art without departing from the spirit and intent of the invention or the scope of the appended claims.

What is claimed is:

1. In a hay loading elevator for trucks, in combination with an elevator structure operatively mounted on one side of said truck and having a driven continuous conveyor thereon, a drive shaft for said conveyor having a driven connection with the drive shaft of said truck and providing a pivotal mounting for said elevator, a crank shaft arranged forwardly of said elevator and having its inner end rotatively journalled to the frame of said truck, means forming part of said journal support for said crankshaft moving the same longitudinally in the rotation thereof while said elevator is raised and lowered, a winch having a cable thereon connected to said crankshaft for rotating the same to move said elevator to operative and inoperative positions, and a crank for said winch arranged in accessible position for manual operation from the cab of said truck.

2. In a loader device for trucks, in combination with an inclined elevator structure having a traveling conveyor operating thereon, a driven shaft having a transverse driven connection with the drive shaft of said truck and extending from the side thereof, the extended portion of said transverse shaft providing a pivotal support for said elevator, a crankshaft rotatively journalled to said frame and extending outwardly therefrom, a pair of arms pivotally connected at their lower ends to the outer end of said crank shaft and at their upper ends to the underside of said elevator, means attached to said truck frame and forming a part of the journal for said crankshaft for moving the latter longitudinally as the same is rotated, and a winch having a cable thereon connected to said crankshaft for rotating the same from the cab of said truck.

3. In a loading device for trucks, in combination with an adjustable inclined elevator structure pivotally attached to the side of said truck, a drive shaft for said elevator having a transverse driven connection with the drive shaft of said truck and providing a pivotal support for said elevator, a crankshaft rotatively supported by the frame of said truck forwardly thereof and having its outer end extending beneath said elevator, a pair of arms pivotally linking said outer end of said crankshaft to said elevator structure, means for moving said crankshaft longitudinally as the same is rotated whereby to move said elevator structure sideways with relation to said truck, and means accessible to the cab of said truck for manually raising and lowering said elevator on its said pivotal support.

4. In an adjustable operating mechanism for an inclined elevator structure for trucks having a pivotal support thereon, in combination with said elevator structure, a crankshaft having a journal support on the frame of a truck and extending from one side thereof, a pair of arms pivotally attached to the outer end of said crank and providing a connection between said crankshaft and said elevator structure, means in said journal support moving said crankshaft longitudinally thereof as the latter is rotated whereby to move said elevator structure laterally while being raised and lowered, and means accessible to the cab of said truck for operating the said elevator structure on its said pivotal support.

5. In an adjustable inclined elevator for hay, or the like, for attachment to a truck, in combination with a frame structure for said elevator having a traveling conveyor thereon, a driven shaft having a transverse connection with the drive shaft of said truck, an arrangement of pulleys and belts operated by said driven shaft for driving said conveyor, a crank assembly rotatively supported on said truck and having a pivotal connection with said frame structure whereby to be rotated to raise and lower the same, means on said crank assembly moving the same longitudinally as it is oscillated, and a cable and winch operative from the cab of said truck for rotating said crank assembly.

6. In a loading device for trucks, in combination, an elevator frame having a continuous conveyor thereon, a driven shaft for said conveyor connected to the drive shaft of said truck and providing a pivot for said elevator frame, a crankshaft journalled to the frame of said truck and operatively supporting the forward end of said elevator frame whereby to raise and lower the same on its said pivot, means moving said crankshaft longitudinally as the same is rotated, and manual means for rotating said crankshaft.

HERSEL G. CANTRELL.

References Cited in the file of this patent

UNITED STATES PATENTS

| Number | Name | Date |
|---|---|---|
| 2,093,300 | Adams | Sept. 14, 1937 |
| 2,312,779 | Smith | Mar. 2, 1943 |
| 2,343,133 | Blank | Feb. 29, 1944 |
| 2,368,353 | Fulper | Jan. 30, 1945 |
| 2,409,143 | McElhinney | Oct. 8, 1946 |
| 2,541,523 | Lang | Feb. 13, 1951 |
| 2,543,563 | Appel | Feb. 27, 1951 |
| 2,551,427 | Ellefson | May 1, 1951 |
| 2,594,221 | Ryan | Apr. 22, 1952 |